(12) United States Patent
Lee et al.

(10) Patent No.: US 7,909,177 B2
(45) Date of Patent: Mar. 22, 2011

(54) BRAID-REINFORCED COMPOSITE HOLLOW FIBER MEMBRANE

(75) Inventors: Moo Seok Lee, Seoul (KR); Kwang Jin Lee, Suwon-si (KR); Yong-Cheol Shin, Seoul (KR)

(73) Assignee: Kolon Industries, Inc., Kwacheon-si (KR)

( * ) Notice: Subject to any disclaimer, the term of this patent is extended or adjusted under 35 U.S.C. 154(b) by 236 days.

(21) Appl. No.: 12/095,294

(22) PCT Filed: Nov. 28, 2006

(86) PCT No.: PCT/KR2006/005031
§ 371 (c)(1),
(2), (4) Date: May 28, 2008

(87) PCT Pub. No.: WO2007/064123
PCT Pub. Date: Jun. 7, 2007

(65) Prior Publication Data
US 2008/0305290 A1 Dec. 11, 2008

(30) Foreign Application Priority Data

Nov. 29, 2005 (KR) .......... 10-2005-0114681
Nov. 29, 2005 (KR) .......... 10-2005-0114684

(51) Int. Cl.
*B01D 39/00* (2006.01)
*B01D 29/00* (2006.01)
(52) U.S. Cl. .............. 210/490; 210/500.23; 210/500.36; 210/500.27; 210/500.42; 428/36.4
(58) Field of Classification Search .......... 210/490, 210/500.27, 500.36, 500.41, 500.23, 500.42; 264/48, 49, 41; 428/36.4, 310.5; 427/294, 427/296
See application file for complete search history.

(56) References Cited

U.S. PATENT DOCUMENTS 3,644,139 A 2/1972 Schwarz
(Continued)

FOREIGN PATENT DOCUMENTS

DE 10358477 B3 4/2005
(Continued)

OTHER PUBLICATIONS

Extended European Search Report corresponding to Supplementary European Search Report for counterpart EP 06823739 (inventor: Lee) dated Mar. 26, 2010.
(Continued)

*Primary Examiner* — Ana M Fortuna
(74) *Attorney, Agent, or Firm* — Sughrue Mion, PLLC

(57) ABSTRACT

A braid-reinforced composite hollow fiber membrane is disclosed. The braid-reinforced composite hollow fiber membrane comprising a reinforcing material of a tubular braid and a polymer resinous thin film coated on the surface of the tubular braid is characterized in that: the tubular braid comprises multifilaments made of monofilaments having a fineness of 0.01 to 0.4 denier, and the peeling strength of the tubular braid and a polymer resinous thin film coated on the surface thereof is 1 to 10 MPa. In the composite hollow fiber membrane, the fineness of the mono filaments constituting the tubular braid of the reinforcing material is small, that is, 0.01 to 0.4 denier, thus the surface area of the tubular braid contacted with the polymer resinous thin film is increased. Thus, the peeling strength of the tubular braid and the polymer resinous thin film coated on the surface thereof is excellent, and at the same time, the initial wetting property of the composite hollow fiber membrane is excellent, that is, 80 to 120%, due to a capillary tube phenomenon or the like.

23 Claims, 1 Drawing Sheet

U.S. PATENT DOCUMENTS

| | | | |
|---|---|---|---|
| 3,948,781 A * | 4/1976 | Brun et al. | 210/500.37 |
| 4,061,821 A | 12/1977 | Hayano et al. | |
| 5,472,607 A | 12/1995 | Mailvaganam et al. | |
| 5,914,039 A * | 6/1999 | Mahendran et al. | 210/500.25 |
| 6,156,064 A * | 12/2000 | Chouinard | 623/1.44 |
| 6,354,444 B1 | 3/2002 | Mahendran et al. | |
| 6,709,455 B1 * | 3/2004 | Chouinard | 623/1.32 |
| 7,081,273 B2 * | 7/2006 | Ji | 427/296 |
| 7,165,682 B1 * | 1/2007 | Ji | 210/490 |
| 7,257,872 B2 * | 8/2007 | Shim | 29/33 K |
| 7,267,872 B2 * | 9/2007 | Lee et al. | 428/376 |
| 7,412,804 B1 * | 8/2008 | Bussinger | 52/233 |
| 7,413,804 B2 * | 8/2008 | Lee et al. | 428/376 |
| 2003/0134550 A1 * | 7/2003 | Lee et al. | 442/59 |
| 2005/0205488 A1 | 9/2005 | Shinada et al. | |
| 2008/0251445 A1 | 10/2008 | Kamleiter et al. | |
| 2008/0305290 A1 * | 12/2008 | Lee et al. | 428/36.4 |
| 2009/0039012 A1 * | 2/2009 | Ryu et al. | 210/496 |
| 2010/0024631 A1 * | 2/2010 | Lee et al. | 87/9 |

FOREIGN PATENT DOCUMENTS

| | | | |
|---|---|---|---|
| EP | 1 321 178 A2 * | 6/2003 | |
| EP | 1563895 A1 | 8/2005 | |
| JP | 07-275666 | 10/1995 | |
| JP | 2005013805 A | 1/2005 | |
| KR | 1020030047715 A | 6/2003 | |
| KR | 1020040008935 A | 1/2004 | |
| WO | 02/087610 A1 | 11/2002 | |
| WO | 2004043579 A1 | 5/2004 | |
| WO | WO 2008/097011 | * | 8/2008 |
| WO | WO2009017356 | * | 2/2009 |

OTHER PUBLICATIONS

Notice of Reason for Rejection dated Jul. 27, 2010 in Counterpart Japanese Application No. 2008-542247.

Canadian Office Action issued in corresponding CA Application No. 2,630,418 dated Nov. 23, 2010.

* cited by examiner

BRAID-REINFORCED COMPOSITE HOLLOW FIBER MEMBRANE

This is a National Stage Application under 35 U.S.C. §371 of PCT/KR 2006/005031 filed on Nov. 28, 2006, which claims priority from Korean Patent Application 10-2005-0114681 filed on Nov. 29, 2005, and from Korean Patent Application 10-2005-0114684 filed on Nov. 29, 2005, all of which are incorporated herein by reference.

BACKGROUND OF THE INVENTION

1. Technical Field

The present invention relates to a composite hollow fiber membrane having an excellent initial wetting property, peeling strength, filtration reliability, and water permeability.

Recently, polymer separation membranes are being utilized in more various fields as well as existing application fields with the improvement of their techniques. Particularly, with the importance of environment, demands for them are being increased in the fields of water treatment. In all application fields of separation membranes, a mechanical strength, such as peeling strength, always stands out as an important factor as well as selectiveness and water permeability. Particularly, in water treatment fields, an excellent mechanical strength is necessarily required, simultaneously with a high permeability, from the viewpoint of the reliability of a separation membrane system.

2. Background Art

A hollow fiber-shaped membrane has a high permeability per installation area and is suitable for water treatment, whereas the mechanical strength thereof has been a problem to be solved due to the characteristics of a porous membrane structure. Thus, a hollow fiber membrane reinforced with a fabric or tubular braid having an excellent mechanical strength as a support of the separation membrane. Such a general idea of a composite membrane is a well known fact. Techniques thereof are disclosed in U.S. Pat. No. 4,061,821, U.S. Pat. No. 3,644,139, U.S. Pat. No. 5,472,607, No. 6,354,444 and the like.

Among them, a general idea of a composite hollow fiber membrane using a tubular braid was disclosed for the first time in U.S. Pat. No. 4,061,821 to Hayano et al. In this technique, however, the tubular braid is not used as a support for coating, but it is completely embedded in the membrane in order to compensate for a reduction of water permeability due to the shrinkage occurred when an acryl hollow fiber type membrane is solely used at a temperature higher than 80° C. Such a composite membrane has a larger thickness than the thin film coated on a support, and the embedded braid increases the resistance of fluid flow for thereby significantly reducing the water permeability.

Unlike the prior art, in U.S. Pat. No. 5,472,607, a reinforcing material is not embedded in the membrane, but is coated on its surface with a thin film by coating method of the existing flat composite membrane. In manufacturing a composite hollow fiber membrane having a thin film layer coated on the surface of a reinforcing material or supporting material of a tubular braid, thermodynamic stability differs according to the composition of a dope to be used for coating. This determines the structure of the coated thin film layer.

That is to say, in case of a thermodynamically stable dope, it has a finger-like structure. On the contrary, a dope with a low thermodynamic stability has a sponge structure with no defect region. For instance, in case of a dope used a solvent having a strong solvent power such as N-methyl-2-pyrrolidone (NMP) among organic solvents, it can easily form a finger-type structure because it has a high thermodynamic stability.

Additionally, the water permeability and mechanical strength of the overall composite hollow fiber membrane depends upon the structure and properties of the thin film layer. This is because the thin film layer has small pores and a low mechanical strength than a tubular braid reinforcing material having relatively much larger pores and a higher strength. In other words, the filtrate having passed through the thin film layer passes through a braid supporting layer with relatively large pores without a large resistance. While, since the thin film layer has a large flow resistance, the water permeability of the overall membrane is determined according to a microporous structure and porosity.

In view of strength, the tensile strength, pressure resistance and the like are complemented by the braid reinforcing material having a far superior mechanical strength. However, if the strength of the thin film is reduced, the thin film is separated or damaged.

In U.S. Pat. No. 4,061,821 and U.S. Pat. No. 5,472,607, the significance of the coated thin film layer structure was overlooked in relative to the present invention. Particularly, the structure of the thin film layer in the two prior arts has a porous region larger than 5 µm in an inner layer of a skin, that is, the inner layer has some micro pores having a pore diameter larger than 5 µm.

FIG. 2 is an exploded sectional view of a composite hollow fiber membrane disclosed in U.S. Pat. No. 4,061,821; and FIG. 3 is an exploded sectional view of a composite hollow fiber membrane disclosed in U.S. Pat. No. 5,472,607. These membranes are in a finger-like structure as shown in FIGS. 2 and 3 and have a defect region D functioning as a defect in the thin film layer.

As seen from the well-known fact, they can acts as a defect in expressing the mechanical properties of the thin film. Particularly, when the skin of a dense layer is damaged, a material capable of being secondarily cut off by the inner layer is permeated. This reduces the filtration reliability of the membrane relatively.

The composite hollow fiber membrane is suitable, particularly for filtration modules in the fields of water treatment due to its superior mechanical strength. In such a filtration module, there is a possibility of damaging the surface of the membrane by the friction and physical impact generated between membranes due to aeration. Particularly, filtration by the inner layer is required so as to ensure high filtration reliability.

Meanwhile, U.S. Pat. No. 6,354,444 proposes a composite hollow fiber membrane coated with a polymer resinous thin film on a braid made of monofilaments having a fineness of 0.5 to 7 denier. However, in the composite hollow fiber membrane, the braid is made of monofilaments of 0.5 or higher denier, so the surface area of the braid contacted with the polymer resinous thin film is small, which leads to a low peeling strength between the braid and the polymer resin coated on its surface. In order to firstly apply the composite hollow fiber membrane to a treatment plant, air of micro pores existing in a separation membrane (coating layer) of the hollow fiber membrane has to be removed to thus activate water permeability. Particularly, the absorption property (initial wetting property) for removing air as water is naturally permeated into the micro pores of a dried membrane is low, there is a problem in the application of water permeability. Therefore, most of water treatment separation membranes are applied in a manner that the separation membranes are soaked in a soak solution in advance in a manufacturing process due to such a low initial wetting property and stored and transported in a wet state, or in case of application of the dried membrane to the site, the dried membrane is immersed in an alcohol aqueous solution or the like which is more readily permeable into the micro pores than water is, thereby activating initial permeability. However, in this case, since the dried membrane is stored and transported in a wet state, a separate preservative treatment and the weight of the dried membrane is high, and if an alcohol aqueous solution is used in a dried state, a large amount of waste solution is generated and a separate process is required.

DETAILED DESCRIPTION OF THE INVENTION

Problem to be Solved by the Invention

It is an object of the present invention to provide a composite hollow fiber membrane having an excellent peeling strength, initial wetting property, filtration reliability, and water permeability by coating a polymer resinous thin film on the support of a braid.

The present invention provides a composite hollow fiber membrane reinforced with a tubular braid having excellent peeling strength of a tubular braid and a polymer resinous thin film coated on the surface thereof and superior initial wetting property.

The present invention helps to increase the surface area of a tubular braid contacted with a polymer resinous thin film and allows air existing within the membrane to be easily discharged by a capillary tube phenomenon at the time of initial use by making monofilaments constituting a tubular braid superfine.

Technical Solution

The braid-reinforced composite hollow fiber membrane comprising a reinforcing material of a tubular braid and a polymer resinous thin film coated on the surface of the tubular braid according to the present invention is characterized in that: the tubular braid comprises multifilaments made of monofilaments having a fineness of 0.01 to 0.4 denier, and the peeling strength of the tubular braid and a polymer resinous thin film coated on the surface thereof is 1 to 10 MPa.

In addition, the composite hollow fiber membrane comprising a reinforcing material of a tubular braid and a polymer resinous thin film coated on the surface of the tubular braid according to the present invention is characterized in that: the tubular braid comprises multifilaments made of monofilaments having a fineness of 0.01 to 0.4 denier, and the initial wetting property of the composite hollow fiber membrane is 80 to 120%.

The present invention will now be described in detail with reference to the accompanying drawings.

The composite hollow fiber membrane of the present invention has a structure in which a polymer resinous thin film (A) is coated on the surface of the reinforcing material of a tubular braid (B). FIG. 1 is a schematic cross sectional view of a composite hollow fiber membrane according to the present invention.

In the present invention, the tubular braid (B) comprises multifilaments consisting of monofilaments having a fineness of 0.01 to 0.4 denier and, thus the initial wetting property of the composite hollow fiber membrane is excellent, that is, 80 to 120%.

Due to this, the peeling strength of the tubular braid (B) and the polymer resinous thin film (A) is excellent, that is, 1 to 10 MPa.

If the fineness of the monofilaments is above 0.4 denier, the surface area of the tubular braid (B) contacted with the polymer resinous thin film (A) is reduced, which leads to initial wetting property of below 80% and a low peeling strength of less than 1 MPa between the tubular braid (B) and the polymer resinous thin film (A) coated on its surface.

In addition, if the fineness of the monofilaments is less than 0.01 denier, the initial wetting property and peeling strength of the tubular braid (B) and the polymer resinous thin film (A) are improved, but the manufacturing process becomes complicated and the manufacturing costs are raised.

Preferably, the multifilaments constituting the tubular braid (B) consist of 150 to 7,000 monofilaments and have a total fineness of 30 to 140 deniers.

Preferably, the tubular braid (B) is knit by using 16 to 60 gray yarns for knitting prepared by combining 4 to 10 multifilaments.

The polymer resinous thin film comprises a skin layer of a dense structure and an inner layer of a sponge structure. The skin layer is formed with micro pores having a diameter in the range from 0.01 to 1 μm. The inner layer is formed with micro pores having a diameter less than 10 μm, preferably, 5 μm.

The present invention is characterized in that it has no defect region larger than 10 μm in the inner layer of the polymer resinous thin film, that is, there exist no micro pores having a diameter larger than 10 μm.

In a case that any defect region larger than 10 μm exists in the inner layer, the filtration reliability can be reduced greatly. Preferably, the diameters of micro pores formed in the inner layer of the sponge structure are continuously and gradually increased with the approach to the central direction of the composite hollow fiber membrane.

To improve both mechanical strength and water permeability, it is preferable that the thickness of the polymer resinous thin film is less than 0.2 mm and the penetrating length of the polymer resinous thin film into the reinforcing material is less than 30% of the reinforcing material thickness.

The polymer resinous thin film is made from a spinning dope consisting of polymer resin, organic solvent, polyvinylpyrrolidone and hydrophilic compound.

The composite hollow fiber membrane of the present invention can be made by passing a tubular braid (reinforcing material) through the center portion of a double tubular nozzle and simultaneously feeding a spinning dope for the polymer resinous thin film on the surface of the braid through the nozzle, coating the spinning dope on the braid, extruding them in the air of outside the nozzle, coagulating them in a external coagulating liquid to form the composite hollow fiber membrane structure, and washing and drying it.

At this time, the spinning dope for the polymer resinous thin film is obtained by dissolving polymer resin, polyvinylpyrrolidone and hydrophilic compound in an organic solvent. More preferably, the spinning dope is made of polymer resin of 10 to 50% by weight, polyvinylpyrrolidone and a hydrophilic compound of 9 to 30% by weight and an organic solvent of 20 to 89% by weight. However, in the present invention, the composition ratio of the spinning dope is not specifically limited.

The polymer resin is polysulfone resin, polyethersulfone resin, sulfonated polysulfone resin, polyvinylidenefluoride (PVDF) resin, polyacrylonitrile (PAN) resin, polyimide resin, polyamideimide resin, polyetherimide resin and so on. The organic solvent is dimethyl acetamide, dimethyl formamide or a mixture thereof.

The hydrophilic compound is water or glycol compound, and more preferably, polyethylene glycol having a molecular weight less than 2,000. Since the water or glycol compound, which is hydrophilic, reduces the stability of the spinning dope, it is more likely to form a sponge structure relatively.

That is, as the stability of the spinning dope becomes higher, it is more likely to form a finger-like structure because a defect region (micro pores having a diameter larger than 10 μm) is formed in the membrane. The present invention reduces the stability of the spinning dope by adding water or glycol compound, an additive, simultaneously to increase the water permeability by making the membrane hydrophilic.

Meanwhile, in the process of producing the composite hollow fiber membrane, in order to uniformly coat a polymer resinous thin film on the surface of the reinforcing material of the tubular braid at a predetermined thickness, the speed with which the tubular braid is advanced and the quantity of the spinning dope introduced into the nozzle must be balanced with each other. The relation between the feed rate (Q) of a spinning dope and the speed (u) of a tubular braid is expressed by the formula $$Q = \pi \rho v D_o T$$

[wherein Q denotes the feed rate of dope per hour, ρ denotes the density of dope, U denotes the advancing speed of the braid, $D_o$ denotes the outer diameter of the braid and T denotes the thickness of the dope to be coated.]

As seen from the above formula, in case that the advancing speed of the braid is high, a thin coating layer is formed. In case that the advancing speed of the braid is extremely higher in relative to the feed rate of the spinning dope, a non-uniform membrane with no coating layer on some parts is produced. Otherwise, a non-uniform membrane with a partially thick coating layer is produced. That is, it can be known that there exists an optimum speed ratio for stably producing a membrane with a uniform thickness.

In addition, the polymer resinous thin film of the composite hollow fiber membrane according to the present invention comprises a dense skin layer and an inner layer of a sponge structure whose pore diameter becomes gradually larger with the approach to the center of the composite hollow fiber membrane Due to this, the composite hollow fiber membrane of the present invention has an excellent peeling strength, initial wetting property, filtration reliability and water permeability.

In the present invention, the physical properties of the composite hollow fiber membrane are evaluated by the following method.

Peeling Strength

The load at the instant when a coated polymer resinous thin film is peeled from a tubular braid by using a tensile tester was measured and divided into the area m² to which shear strength is applied to thus calculate the peeling strength.

Specific measurement conditions are as follows.
measuring instrument: Instron 4303
load cell: 1 KN
crosshead speed: 25 mm/min
sample: The sample was produced by bonding and securing one strand of a composite hollow fiber membrane to a polypropylene tube having a 6 m=diameter by using polyurethane resin so that the length of the bonding portion should be 10 mm.

$$\text{Peeling Strength } (Pa) = \frac{\text{load of yield point (kg)}}{\text{application area of shear strength (m}^2\text{)}}$$

The peeling strength is defined as the shear strength per unit area applied to a coated polymer resinous thin film when the sample is extended.

The application area (m²) of the shear strength is calculated by the formula: π×outer diameter of composite hollow fiber membrane×length of bonding portion of composite hollow fiber membrane.

Initial Wetting Property

The water permeability of the composite hollow fiber membrane, which was dried according to the above-described method, and the water permeability of the composite hollow fiber membrane, which was obtained by fully immersing composite hollow fiber membrane in a 30% aqueous solution of alcohol, leaving it for 5 minutes and rising it with pure water to remove alcohol were measured, respectively. Then, the measured water permeability values were substituted into the following formula to obtain the initial wetting property.

$$\text{Initial Wetting Property } (\%) = \frac{\text{water permeability of composite hollow fiber membrane of dried state}}{\text{water permeability of composite hollow fiber membrane treated with alcohol and pure water}} \times 100$$

Water Permeability

The water permeability was measured by preparing a mini-module having an effective length of 10 cm in the composite hollow fiber membrane and passing pure water through the module for a predetermined time by out-in flow method under a suction pressure of 1 kg at a temperature of 25° C.

$$\text{Water Permeability } (g/(cm)^2 \cdot min \cdot kg/(cm)^2) = \frac{\text{permeation quantity (g)}}{\text{permeation area of hollow fiber membrane } ((cm)^2) \times \text{pressure } (kg/(cm)^2) \times \text{permeation time (min)}}$$

Shape of Micro Pores

The fracture surface of the polymer resinous thin film layer coated on the surface of the support (reinforcing material) was observed with a scanning electron microscope.

The composite hollow fiber membrane of the present invention produced by the above method has an excellent initial wetting property of 80 to 120% and an excellent peeling strength of 1 to 10 MPa between the tubular braid (B) and the polymer resinous film (A) coated on its surface.

Effect of the Invention

Additionally, the composite hollow fiber membrane of the present invention provides excellent initial wetting property, so it is possible to omit the process of removing air in the membrane with a liquid having a low surface tension before use. Due to this, the composite hollow fiber membrane can be transported in a dried state and used as it is. The composite hollow fiber membrane of the present invention also has excellent peeling strength of the tubular braid and the polymer resinous thin film coated on its surface.

BEST MODE FOR CARRYING OUT THE INVENTION

Figure 1:
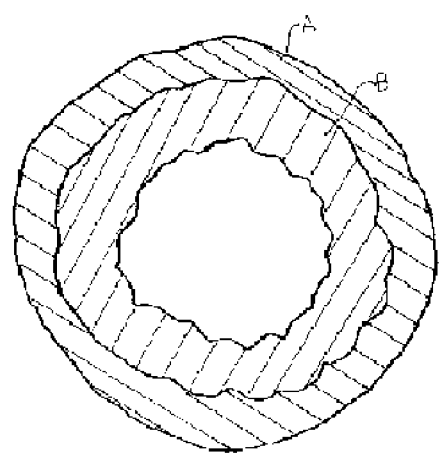
FIG. 1 is a schematic cross sectional view of a composite hollow fiber membrane according to the present invention.
Figure 2:
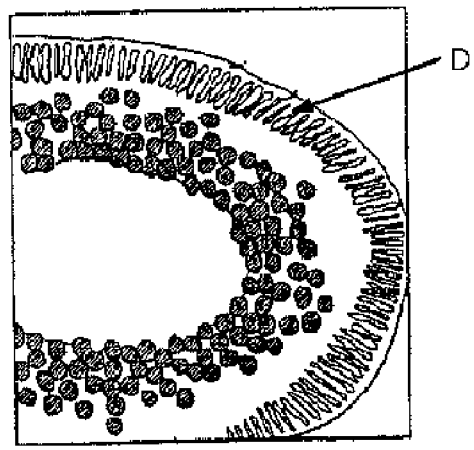
FIGS. 2 and 3 are enlarged cross sectional views of conventional hollow fiber membranes.
Figure 3:
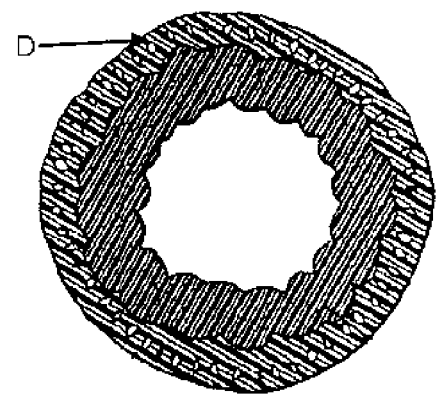

The present invention is now understood more concretely by comparison between examples of the present invention and comparative examples. However, the present invention is not limited to such examples.

Example 1

A spinning dope is prepared from components: 17% by weight of polysulfone, 9% by weight of polyvinylpyrrolidone, and 10% by weight of polyethyleneglycol added to 64% by weight of dimethylformamide (organic solvent), to produce a transparent spinning dope by mixing and dissolving the components. The spinning dope is fed into a double tubular nozzle having a 2.38 mm+diameter and simultaneously a tubular braid, which is knit to have an outer diameter of 2 mm by using 12 gray yarns for knitting prepared by combining 6 multifilaments having 65 deniers comprising 216 strands of monofilaments having a fineness of 0.3 denier, is passed through the center portion of the nozzle, to thus coat the spinning dope on the surface of the tubular braid and then extrude it in the air. At this time, the ratio (k) of the advancing speed of the braid to the feed rate of the spinning dope is 750 $g/m^2$, and the coating thickness of the spinning dope is 0.2 mm. After passing through the tubular braid coated with the spinning dope into a 10 cm air gap, it is coagulated in an external coagulating bath with a temperature of 35° C. Subsequently, the composite hollow fiber membrane is prepared by washing in a washing tank and winding. The result of evaluation for the structure and physical properties of the produced composite hollow fiber membrane is shown in Table 1.

Example 2

A composite hollow fiber membrane is produced in the same process and condition as Example 1, except that a tubular braid is used, which is knit to have an outer diameter of 2 mm by using 12 gray yarns for knitting prepared by combining 6 multifilaments having 65 deniers comprising 650 strands of monofilaments having a fineness of 0.1 denier. The result of evaluation for the structure and physical properties of the produced composite hollow fiber membrane is shown in Table 1.

Example 3

A composite hollow fiber membrane is produced in the same process and condition as Example 1, except that polyvinylidene fluoride resin is used as the polymer resin in the production of a spinning dope. The result of evaluation for the structure and physical properties of the produced composite hollow fiber membrane is shown in Table 1.

Example 4

A composite hollow fiber membrane is produced in the same process and condition as Example 2, except that polyvinylidene fluoride resin is used as the polymer resin in the production of a spinning dope. The result of evaluation for the structure and physical properties of the produced composite hollow fiber membrane is shown in Table 1.

Example 5

A spinning dope is prepared from components: 17% by weight of polysulfone, 9% by weight of polyvinylpyrrolidone, and 10% by weight of polyethyleneglycol added to 64% by weight of dimethylformamide (organic solvent), to produce a transparent spinning dope by mixing and dissolving the components. The spinning dope is fed into a double tubular nozzle having a 2.38 mmφ diameter and simultaneously a tubular braid, which is knit to have an outer diameter of 2 mm by using 12 gray yarns for knitting prepared by combining 6 multifilaments having 82 deniers comprising 205 strands of monofilaments having a fineness of 0.4 denier, is passed through the center portion of the nozzle, to thus coat the spinning dope on the surface of the tubular braid and then extrude it in the air. At this time, the ratio (k) of the advancing speed of the braid to the feed rate of the spinning dope is 750 $g/m^2$, and the coating thickness of the spinning dope is 0.2 mm. After passing through the tubular braid coated with the spinning dope into a 10 cm air gap, it is coagulated in an external coagulating bath with a temperature of 35° C. Subsequently, the composite hollow fiber membrane is prepared by washing in a washing tank and winding. The result of evaluation for the structure and physical properties of the produced composite hollow fiber membrane is shown in Table 1.

Example 6

A composite hollow fiber membrane is produced in the same process and condition as Example 1, except that a tubular braid is used, which is knit to have an outer diameter of 2 mm by using 12 gray yarns for knitting prepared by combining 6 multifilaments having 60 deniers comprising 600 strands of monofilaments having a fineness of 0.1 denier. The result of evaluation for the structure and physical properties of the produced composite hollow fiber membrane is shown in Table 1.

Comparative Example 1

A composite hollow fiber membrane is produced in the same process and condition as Example 1, except that a tubular braid is used, which is knit to have an outer diameter of 2 mm by using 16 gray yarns for knitting prepared by 3 multifilaments having 150 deniers comprising 300 strands of monofilaments having a fineness of 0.5 denier. The result of evaluation for the structure and physical properties of the produced composite hollow fiber membrane is shown in Table 1.

Comparative Example 2

A composite hollow fiber membrane is produced in the same process and condition as Example 1, except that a tubular braid is used, which is knit to have an outer diameter of 2 mm by using 16 gray yarns for knitting prepared by 3 multifilaments having 100 deniers comprising 200 strands of monofilaments having a fineness of 0.5 denier. The result of evaluation for the structure and physical properties of the produced composite hollow fiber membrane is shown in Table 1.

TABLE 1

Result of Physical Properties of Composite Hollow Fiber Membrane

| Classification | Initial Wetting Property (%) | Peeling Strength (MPa) |
| --- | --- | --- |
| Example 1 | 98 | 1.88 |
| Example 2 | 105 | 3.29 |
| Example 3 | 81 | 2.15 |
| Example 4 | 92 | 3.50 |
| Example 5 | 93 | 1.65 |
| Example 6 | 108 | 3.32 |
| Comparative Example 1 | 53 | 0.85 |
| Comparative Example 2 | 55 | 0.87 |

INDUSTRIAL APPLICABILITY

Additionally, the composite hollow fiber membrane of the present invention provides excellent initial wetting property, so it is possible to omit the process of removing air in the membrane with a liquid having a low surface tension before use. Due to this, the composite hollow fiber membrane can be transported in a dried state and used as it is. The composite hollow fiber membrane of the present invention also has excellent peeling strength of the tubular braid and the polymer resinous thin film coated on its surface.

The composite hollow fiber membrane of the present invention is reinforced with a support of a braid and has no defect region greater than 10 µm in the inner layer (sponge structure) of the polymer resinous thin film (no micro pores greater than 10 µm formed in the inner layer. Therefore, the water permeability, mechanical strength and filtration reliability thereof are excellent. As the result, the composite hollow fiber membrane of the present invention is particularly suitable for filtration modules in the fields of water treatment of a large size.

What is claimed is:

1. A braid-reinforced composite hollow fiber membrane comprising a reinforcing material of a tubular braid and a polymer resinous thin film coated on the surface of the tubular braid, wherein the tubular braid comprises multifilaments made of monofilaments having a fineness of 0.01 to 0.4 denier, the peeling strength of the composite hollow fiber membrane is 1 to 10 MPa, the tubular braid is knit with 16 to 60 gray yarns, and each of the gray yarns is composed of 4 to 10 multifilaments.

2. The braid-reinforced composite hollow fiber membrane of claim 1, wherein the multifilaments constituting the tubular braid consist of 150 to 7,000 monofilaments.

3. The braid-reinforced composite hollow fiber membrane of claim 1, wherein the fineness of the multifilaments is 30 to 140 deniers.

4. The braid-reinforced composite hollow fiber membrane of claim 1, wherein the thickness of the polymer resinous thin film is less than 0.2 mm.

5. The braid-reinforced composite hollow fiber membrane of claim 1, wherein the penetrating length of the polymer resinous thin film into the reinforcing material is less than 30% of the reinforcing material thickness.

6. The braid-reinforced composite hollow fiber membrane of claim 1, wherein the polymer resinous thin film is made from a spinning dope consisting of polymer resin, organic solvent, polyvinylpyrrolidone and hydrophilic compound.

7. The braid-reinforced composite hollow fiber membrane of claim 6, wherein the hydrophilic compound is water or glycol compound.

8. The braid-reinforced composite hollow fiber membrane of claim 7, wherein the glycol compound is polyethylene glycol having a molecular weight less than 2,000.

9. The braid-reinforced composite hollow fiber membrane of claim 6, wherein the organic solvent includes dimethyl acetamide, dimethyl formamide or a mixture thereof.

10. The braid-reinforced composite hollow fiber membrane of claim 6, wherein the polymer resin is polysulfone resin, polyethersulfone resin, sulfonated polysulfone resin, polyvinylidenefluoride resin, polyacrylonitrile resin, polyimide resin, polyamideimide resin or polyetherimide resin.

11. The braid-reinforced composite hollow fiber membrane of claim 1, wherein the polymer resin is polysulfone resin, polyethersulfone resin, sulfonated polysulfone resin, polyvinylidenefluoride resin, polyacrylonitrile resin, polyimide resin, polyamideimide resin or polyetherimide resin.

12. A braid-reinforced composite hollow fiber membrane comprising a reinforcing material of a tubular braid and a polymer resinous thin film coated on the surface of the tubular braid, wherein the tubular braid comprises multifilaments made of monofilaments having a fineness of 0.01 to 0.4 denier, the initial wetting property of the composite hollow fiber membrane is 80 to 120%, the tubular braid is knit with 16 to 60 gray yarns, and the each of the gray yarns is composed of 4 to 10 multifilaments.

13. The braid-reinforced composite hollow fiber membrane of claim 12, wherein the peeling strength of the composite hollow fiber membrane is 1 to 10 MPa.

14. The braid-reinforced composite hollow fiber membrane of claim 12, wherein the multifilaments constituting the tubular braid consist of 150 to 7,000 monofilaments.

15. The braid-reinforced composite hollow fiber membrane of claim 12, wherein the fineness of the multifilaments is 30 to 140 deniers.

16. The braid-reinforced composite hollow fiber membrane of claim 12, wherein the thickness of the polymer resinous thin film is less than 0.2 mm.

17. The braid-reinforced composite hollow fiber membrane of claim 12, wherein the penetrating length of the polymer resinous thin film into the reinforcing material is less than 30% of the reinforcing material thickness.

18. The braid-reinforced composite hollow fiber membrane of claim 12, wherein the polymer resinous thin film is made from a spinning dope consisting of polymer resin, organic solvent, polyvinylpyrrolidone and hydrophilic compound.

19. The braid-reinforced composite hollow fiber membrane of claim 18, wherein the hydrophilic compound is water or glycol compound.

20. The braid-reinforced composite hollow fiber membrane of claim 19, wherein the glycol compound is polyethylene glycol having a molecular weight less than 2,000.

21. The braid-reinforced composite hollow fiber membrane of claim 18, wherein the organic solvent includes dimethyl acetamide, dimethyl formamide or a mixture thereof.

22. The braid-reinforced composite hollow fiber membrane of claim 18, wherein the polymer resin is polysulfone resin, polyethersulfone resin, sulfonated polysulfone resin, polyvinylidenefluoride resin, polyacrylonitrile resin, polyimide resin, polyamideimide resin or polyetherimide resin.

23. The braid-reinforced composite hollow fiber membrane of claim 12, wherein the polymer resin is polysulfone resin, polyethersulfone resin, sulfonated polysulfone resin, polyvinylidenefluoride resin, polyacrylonitrile resin, polyimide resin, polyamideimide resin or polyetherimide resin.

* * * * *